US006497852B2

(12) United States Patent
Chakravarti et al.

(10) Patent No.: US 6,497,852 B2
(45) Date of Patent: Dec. 24, 2002

(54) CARBON DIOXIDE RECOVERY AT HIGH PRESSURE

(76) Inventors: Shrikar Chakravarti, 12 Gina Meadows, East Amherst, NY (US) 14051; Amitabh Gupta, 5584 Kippen Dr., East Amherst, NY (US) 14051

( * ) Notice: Subject to any disclaimer, the term of this patent is extended or adjusted under 35 U.S.C. 154(b) by 44 days.

(21) Appl. No.: 09/742,451

(22) Filed: Dec. 22, 2000

(65) Prior Publication Data

US 2002/0081256 A1 Jun. 27, 2002

(51) Int. Cl.$^7$ .............................................. B01D 53/62
(52) U.S. Cl. ...................... 423/228; 423/220; 423/226; 423/229
(58) Field of Search .............................. 423/220, 226, 423/228, 229

(56) References Cited

U.S. PATENT DOCUMENTS

| | | | |
|---|---|---|---|
| 2,559,580 A | 7/1951 | Alexander | 423/229 |
| 4,336,233 A | 6/1982 | Appl et al. | 423/228 |
| 4,364,915 A | 12/1982 | Proctor | 423/437 |
| 4,440,731 A | 4/1984 | Pearce | 423/228 |
| 4,477,419 A | 10/1984 | Pearce et al. | 423/228 |
| 4,624,839 A | 11/1986 | Wolcott et al. | 423/228 |
| 4,869,884 A | 9/1989 | Riggs | 423/229 |
| 5,061,465 A | 10/1991 | Carter | 423/229 |
| 5,378,442 A | 1/1995 | Fujii et al. | 423/228 |
| 5,603,908 A | 2/1997 | Yoshida et al. | 423/220 |
| 5,618,506 A | 4/1997 | Suzuki et al. | 423/228 |
| 5,853,680 A | 12/1998 | Iijima et al. | 423/220 |
| 6,146,603 A | 11/2000 | Chakravarti et al. | 423/228 |
| 6,165,433 A | 12/2000 | Chakravarti et al. | 423/229 |
| 6,174,506 B1 | 1/2001 | Chakravarti et al. | 423/220 |

FOREIGN PATENT DOCUMENTS

| | | | |
|---|---|---|---|
| CA | 1091429 | * 12/1980 | 423/229 |
| DE | 1517586 | 7/1969 | 95/265 |
| EP | 331788 A1 | 3/1989 | |
| EP | 0417342 A1 | 3/1991 | |
| EP | 588178 A2 | 3/1994 | |
| JP | 56-161806 | 12/1981 | |
| JP | 57-201583 A | 12/1982 | |
| SU | 654274 | 3/1974 | 95/263 |

OTHER PUBLICATIONS

Kohl, A. et al., "Gas Purification", 5$^{th}$ Ed., pp. 40, 41, 48–57, 98, 99, 115–117, 123–125, 144–149 (1997) ISBN 0–88415–220–0.
Barchas et al., "Energy Convers. Mgmt.", vol. 33, No. 5–8, pp. 333–340 (1992).
Sander et al., "Energy Convers. Mgmt.", vol. 33, No. 5–8, pp. 341–348 (1992).

* cited by examiner

Primary Examiner—Stanley S. Silverman
Assistant Examiner—Timothy C. Vanoy
(74) Attorney, Agent, or Firm—Donald T. Black

(57) ABSTRACT

Carbon dioxide is recovered from a feed stream whose pressure is up to 30 psia by preferentially absorbing carbon dioxide from said feed stream into a liquid absorbent fluid, pressurizing and heating the resulting stream to a pressure sufficient to enable the stream to reach the top of the stripper at a pressure of 35 psia or greater, and stripping carbon dioxide from said stream in a stripper operating at a pressure of 35 psia or greater and recovering from said stripper a gaseous carbon dioxide product stream having a pressure of 35 psia or greater.

6 Claims, 1 Drawing Sheet

CARBON DIOXIDE RECOVERY AT HIGH PRESSURE

FIELD OF THE INVENTION

The present invention relates to the recovery of carbon dioxide from gaseous streams containing it.

BACKGROUND OF THE INVENTION

Conventionally, merchant liquid $CO_2$ is produced from feed streams with high $CO_2$ content (>95%) using distillation technology. Examples of such sources include ammonia and hydrogen plant off-gases, fermentation sources and naturally-occurring gases in $CO_2$-rich wells. Typically, liquid $CO_2$ is produced at a central plant and then transported to users that could be hundreds of miles away; thereby incurring high transportation costs. The lack of high quality sources and their distance from customers provides motivation to recover $CO_2$ from low concentration sources, which are generally available closer to customer sites. Predominant examples of such sources are flue gases, which typically contain 3–30% $CO_2$ depending upon the fuel and excess air used for combustion.

To produce merchant liquid $CO_2$ from such sources, the $CO_2$ concentration in the feed gas needs to be first upgraded significantly and then sent to a distillation unit. A variety of technologies, including membranes, adsorptive separation (e.g. pressure swing adsorption ("PSA"), vacuum pressure swing adsorption ("VPSA") and temperature swing adsorption ("TSA")), physical absorption and chemical absorption, can be used for upgrading the $CO_2$ purity. The economics (capital and operating costs) of the overall scheme depends upon the purity of the feed, the product purity specifications and recovery obtained. For membranes, adsorptive separations and physical absorption, the cost to obtain a given high product purity is a strong function of the feed purity. On the other hand, chemical absorption provides a convenient means of directly obtaining high purity (>95%) $CO_2$ vapor in a single step because the costs of this technology are relatively insensitive to the feed $CO_2$ content. This vapor can be used as is for applications at the site of $CO_2$ separation or further compressed for downstream recovery, as merchant liquid $CO_2$, or for disposal/sequestration.

Chemical absorption can be performed through the use of alkanolamines as well as carbonate salts such as hot potassium carbonate. However, when using carbonate salts, it is necessary for the partial pressure of $CO_2$ to be at least 15 psia to have any significant recovery. Since flue gases are typically available at atmospheric pressure, use of chemical absorption with carbonate salts would require compression of the feed gas. This is highly wasteful because of the significant energy expended in compressing the nitrogen. On the other hand, there exist alkanolamines that can provide adequate recovery levels of $CO_2$ from lean sources at atmospheric pressure. Thus for recovery of high purity (>95%) $CO_2$ vapor from sources such as flue gases, chemical absorption with alkanolamines would be the preferred choice. The pressure of $CO_2$-rich vapor recovered from such an absorption process is generally around 15–30 psia. Compression of the gas will typically be needed for further use, processing or disposal.

Historically, alkanolamines have found widespread use for $CO_2$ absorption in processes such as natural gas purification and hydrogen production. As the literature indicates (Kohl and Nielsen, "Gas Purification", 5$^{th}$ Edition (1997), pp. 115–117, 123–125, 144–149), the feed gas is typically in excess of 200 psia and $CO_2$-rich vapor is typically obtained at pressures of 15–30 psia. U.S. Pat. No. 5,853,680 discloses a process for the removal of carbon dioxide from high pressure (>425 psia) natural gas. There is no pumping of the $CO_2$-rich alkanolamine liquid. By carrying out the regeneration step without significant depressurization, the disclosed process facilitates recovery of a $CO_2$-rich vapor stream at pressures of 140 psia or higher.

However, there still exists a need for a more efficient process that can directly recover high pressure carbon dioxide from low pressure source streams.

BRIEF SUMMARY OF THE INVENTION

One aspect of the present invention is a process for recovering carbon dioxide, comprising (A) providing a gaseous feed stream comprising carbon dioxide, wherein the pressure of said feed stream is up to 30 psia; (B) preferentially absorbing carbon dioxide from said feed stream into a liquid absorbent fluid comprising an organic amine absorbent to form a carbon dioxide enriched liquid absorbent stream; (C) in any sequence or simultaneously, pressurizing said carbon dioxide enriched liquid absorbent stream to a pressure sufficient to enable the stream to reach the top of the stripper in step (D) at a pressure of 35 psia or greater, and heating the carbon dioxide enriched liquid absorbent stream to obtain a heated carbon dioxide enriched liquid absorbent stream; and (D) stripping carbon dioxide from said carbon dioxide enriched liquid absorbent stream in a stripper operating at a pressure of 35 psia or greater and recovering from said stripper a gaseous carbon dioxide product stream having a pressure of 35 psia or greater. In some preferred embodiments, the pressure in the stripper, and the pressure of the gaseous carbon dioxide product stream, are up to 70 psia.

In other aspects of this process, the stripped liquid absorbent fluid from the stripper is recycled to step (B).

DETAILED DESCRIPTION OF THE INVENTION

Figure 1:
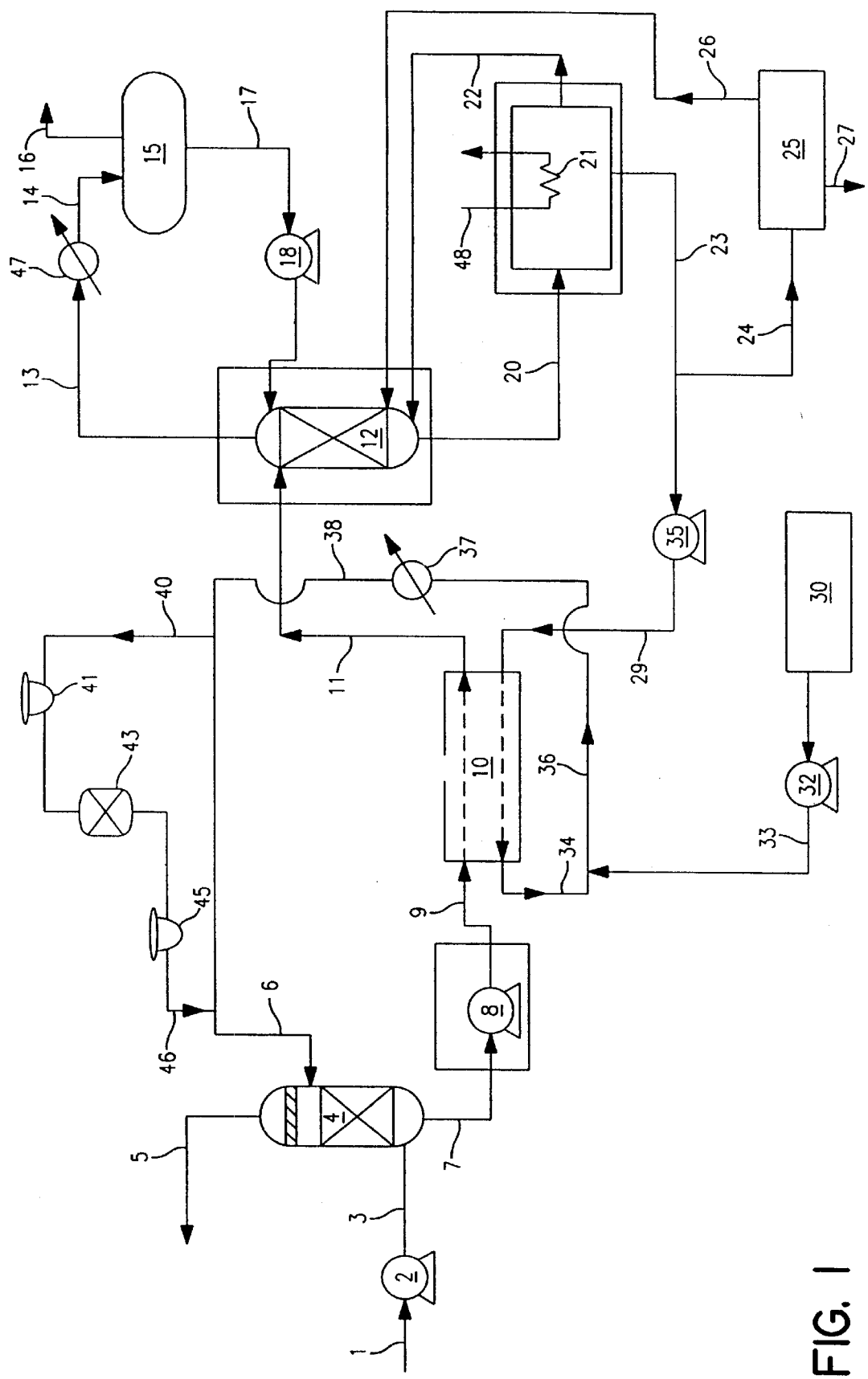
FIG. 1 is a flowsheet showing an embodiment of the present invention.

The following description refers to FIG. 1 which depicts a flowsheet of an improved alkanolamine-based absorption process of the present invention for the recovery of $CO_2$ at high pressure from a low pressure stream such as flue gas. Variations in the flowsheet and equipment used are possible. Further, the temperature and pressure values included in the following description are simply indicative of typical operating conditions.

Gaseous feed stream 1 comprises a stream containing carbon dioxide. Typically, feed stream 1 also contains nitrogen and oxygen. The carbon dioxide content is generally up to 30% (all percentages herein being volume percents unless stated otherwise) and is typically 3 to 30 vol. %, which is typical of flue gas. Feed stream 1 has usually been suitably cooled, and pretreated for removal of particulates and impurities such as SOx and NOx. Feed stream 1 is fed to blower 2.which directs it through line 3 to absorber 4 where the feed stream is contacted (preferably, countercurrently) with a liquid absorbent fluid for the carbon dioxide.

The liquid absorbent fluid is preferably a solution or dispersion, typically in water, of one or more absorbent compounds, that is, compounds which in water create an absorbent fluid that compared to water alone increases the ability of the fluid to preferentially remove carbon dioxide from the feed stream. Examples of such compounds are well known in this art and can readily be ascertained by the practitioner. Preferred for use are organic amine absorbents, and more preferably one or more alkanolamines. Organic amines can be classified into primary (monosubstituted with a group other than hydrogen), secondary (disubstituted with groups other than hydrogen) and tertiary (trisubstituted with groups other than hydrogen) amines. Useful alkanolamines include amines substituted with one, two or three groups each of which is alkanol containing 1, 2, 3, 4, 5 or 6 carbon atoms, wherein the amine is otherwise substituted with hydrogen or with alkyl containing 1, 2, 3, 4, 5 or 6 carbon atoms. Useful organic amines other than alkanolamines include (1) amines substituted with one, two or three alkyl groups each containing 1, 2, 3, 4, 5 or 6 carbon atoms which amines are otherwise substituted with hydrogen; (2) cyclic amines containing one or two nitrogen atoms and a total of 5, 6, 7 or 8 carbon and nitrogen atoms; and (3) diamines containing two nitrogen atoms and 2 through 8 carbon atoms (including diamines wherein each nitrogen is primary, secondary or tertiary). Specific examples of useful alkanolamines include monoethanolamine (primary), diethanolamine (secondary) and methyldiethanolamine (tertiary). Examples of useful organic amines include piperazine and pyrrolidine.

The absorber can be of any construction typical for providing gas-liquid contact and absorption. The temperature in the absorber can typically vary from around 40–45° C. at the top to around 50–60° C. at the bottom. The absorber can operate at slightly above ambient pressure. A mist eliminator at the top of the absorber traps any entrained amine in the absorber vent gas 5, which often is essentially enriched nitrogen. $CO_2$ from the feed gas is preferentially absorbed by the absorbent (i.e., the percentage of the carbon dioxide in the feed gas that is absorbed is greater than the percentage of other gases present in the feed gas), producing a $CO_2$-enriched liquid absorbent stream 7 which emerges from the bottom of the absorber 4 and is fed to the rich solvent pump 8.

Pump 8 compresses the carbon dioxide enriched liquid absorbent stream to a pressure which is sufficient to enable the stream to reach the top of stripper 12 at a pressure of 35 psia or greater. The $CO_2$-rich stream in line 9 is then heated in a countercurrent heat exchanger 10 by the hot regenerated or lean absorbent stream 29 to a temperature of 100–110° C. and is subsequently fed via line 11 to the top of the stripper 12. Alternatively, this stream can be heated before it is compressed in pump 8.

Stripper 12 is a pressurized unit in which carbon dioxide is recovered from the carbon dioxide enriched liquid absorbent stream. In the process of the present invention, the pressures in the reboiler and in the stripper column are maintained at values of around 35 psia or more. This would render the carbon dioxide product at a corresponding pressure of around 35 psia or more. One preferred mode for practice of the present invention is to use an absorbent comprising monoethanolamine and to maintain the pressure in the stripper and reboiler in the range of 40 to 55 psia. Correspondingly, pump 8 would need to pressurize the carbon dioxide enriched absorbent stream to a pressure high enough for it to reach the top of the stripper at a pressure of 40 to 55 psia. Also carbon dioxide product recovered in this process will have a pressure of around 40 to 55 psia.

Higher pressures in the reboiler would correspondingly increase the reboiler temperature. However, care should be taken to ensure that the temperature does not exceed much beyond 140° C., since higher temperatures would accelerate thermal degradation of the absorbent, the products of which can eventually cause significant corrosion of the equipment and overall deterioration in process performance. For example, typical alkanolamines such as monoethanolamine and methyldiethanolamine are known to degrade much faster at the higher temperatures. The temperature at the top of the stripper is typically between 100 and 110° C. while the bottom can be as high as 119–135° C. Chemical inhibitors could be used to reduce the rate of degradation. The optimal pressure in the stripper/reboiler and consequently the pressure at which $CO_2$ is recovered will be determined by the following factors—1) reboiler heat duty, 2) downstream compression requirements, and 3) corrosion behavior at the higher temperatures.

The heated carbon dioxide enriched absorbent stream in line 11 passes into the upper portion of stripping column 12, which is operating at a temperature typically within the range of from 100 to 110° C. at the top of the column and at a temperature within the range of from 119 to 135° C. at the bottom of the column. As the absorbent flows down through stripping column 12, carbon dioxide within the absorbent is stripped into upflowing vapor, which is generally steam, to produce carbon dioxide rich top vapor 13 and carbon dioxide lean absorbent 20. Stream 13 is passed through reflux condenser 47 wherein it is partially condensed. Resulting two phase stream 14 is fed to reflux drum 15 where the product $CO_2$ stream 16 is separated from the condensate 17. The reflux pump 18 pumps the condensate, which primarily consists of absorbent (e.g. alkanolamine) and water, to the stripper 12. The solvent 20 from the bottom of the stripper 12 is heated indirectly in the reboiler 21, which typically operates at a temperature of around 119–135° C. Saturated steam 48 at a pressure of 30 psig or higher can provide the necessary heating. The heated solvent vapor 22, which is primarily steam, is recirculated to the stripper.

The stripped carbon dioxide-lean absorbent solution 23 from the reboiler is pumped back by the lean solvent pump 35 to the heat exchanger 10. A small portion of the stream 23 is withdrawn as stream 24 and fed to a reclaimer 25, where the solution is vaporized. Addition of soda ash or caustic soda to the reclaimer facilitates precipitation of the degradation byproducts and heat stable amine salts. Stream 27 represents the disposal of the degradation byproducts and heat stable amine salts. The vaporized amine solution 26 can be reintroduced into the stripper as shown in FIG. 1. It can also be cooled and directly mixed with the lean stream 6 entering the top of the absorber. Also, instead of the reclaimer shown in FIG. 1, other purification methods such as ion-exchange or electrodialysis could also be employed.

Makeup amine 33 is pumped by pump 32 from storage tank 30 and combined with the lean stream 34, which exits the heat exchanger 10 at a temperature of around 65–75° C., to form stream 36, which is further cooled in cooler 37 to around 40° C. From the cooled lean stream 38, a small portion 40 is withdrawn and purified (removal of impurities, solids, degradation byproducts and heat stable amine salts) through the use of mechanical filters 41 and 45 as well as a carbon bed filter 43. The purified lean stream 46 is added to stream 38 to form stream 6 that is fed to the top of the absorption column 4.

$CO_2$ recovered from flue gas or other feed streams using the above process can be directly used as vapor for onsite applications. Several $CO_2$ applications such as pH control of wastewater can use $CO_2$ vapor directly from the absorption process. However the $CO_2$ vapor would generally need to be delivered at pressures of around 35 psia or more for use in the respective application. The conventional amine based chemical absorption process typically recovers $CO_2$ at pressures of 15–25 psia, thus necessitating compression prior to the onsite application. However, the process described in this invention facilitates recovery of $CO_2$ at pressures of 35 psia or more. This eliminates the need for compression and results in significant capital and operating cost savings.

Alternatively, the $CO_2$ recovered from flue gas or other feed streams using the chemical absorption process may need to be compressed for downstream recovery or sequestration. Merchant liquid $CO_2$ is typically obtained by compression of the $CO_2$ rich vapor stream to pressures of around 300 psia, purification and distillation. Typically the required compression is accomplished in two stages. Recovering $CO_2$ at pressures in excess of 35 psia with the present invention, instead of 15–25 psia, will reduce the compression costs. In some cases, the first stage of compression in the $CO_2$ production plant could be eliminated. For sequestration, $CO_2$ would need to be compressed to pressures of around 1500 psia or higher. By providing the $CO_2$ at a higher pressure using the present invention, e.g. at 50 psia instead of 20 psia, the net compression ratio reduces from 75 to 30. This correspondingly translates into a reduction in the number of stages of compression, thus decreasing compression costs as well as the overall cost to sequester $CO_2$ from flue gases.

This invention is superior to prior recovery processes for several reasons:

Earlier processes for recovery of $CO_2$ from flue gas yield a $CO_2$-rich vapor at 15–25 psia. This $CO_2$ vapor would need to be compressed prior to further use or disposal. For example, the $CO_2$ vapor would need to be compressed to ~300 psia if it is to be used as feed to the standard $CO_2$ plant for production of merchant liquid $CO_2$. Compression from around 15 psia to 300 psia is typically achieved in two stages. Another instance could involve the direct use of $CO_2$ vapor at a slightly elevated pressure (~30–65 psia), as is the case for some onsite applications. By contrast, the high pressure $CO_2$ recovery scheme, presented in this invention, facilitates recovery of $CO_2$ at pressures in excess of 35 psia. Thus, if the $CO_2$ vapor needs to be compressed to ~300 psia, a single stage of compression would potentially suffice as compared to two for the base absorption process. For cases where $CO_2$ vapor is required at pressures of around 35 psia or higher, this new absorption process allows direct recovery of $CO_2$ at the required pressure, thus eliminating the need for any further compression. Finally, for sequestration applications $CO_2$ would typically need to be compressed to pressures of the order of 1500 psia or higher. Recovering $CO_2$ at pressures of 35 psia or higher as opposed to 15–25 psia would reduce the downstream compression costs through a decrease in the number of compression stages and in the energy consumption. Consequently the overall cost of sequestering $CO_2$ from flue gas is reduced.

The process described in U. S. Pat. No. 5,853,680 recovers $CO_2$-rich vapor at pressures of around 140 psia. However, the feed streams to the process are at much higher pressures, e.g. the natural gas feed in the described patent is at a pressure of a or higher. There is no pumping of the $CO_2$-rich absorbent liquid. Also, the operating pressure is significantly less than the operating pressure in the absorber.

By contrast, the process of the present invention essentially works as a $CO_2$-recovery and compression unit. The absorbent liquid selectively absorbs $CO_2$ from a stream at a low pressure (~14.7 psia). The absorber typically operates at a pressure of around 15 psia The $CO_2$-rich absorbent solution is then pumped to pressures of 35 psia or higher. Stripping at an elevated pressure facilitates recovery of $CO_2$-rich vapor at a correspondingly high pressure of about 35 psia or higher. Also, the stripper operating pressure is greater than the operating pressure of the absorber in this process.

Operating the stripping section at higher pressures enables recovery of $CO_2$-rich vapor at pressures of around 35 psia or greater, thereby reducing or eliminating downstream compression costs. While it is also necessary to pump the $CO_2$-rich alkanolamine liquid in pump 8 to higher pressures to match the new operating pressure of the stripper, the incremental energy requirements for pumping the $CO_2$-rich absorbent liquid are much less than compressing $CO_2$ vapor, thereby providing a net advantage for production of higher pressure enriched $CO_2$ vapor.

What is claimed is:

1. A process for recovering carbon dioxide, comprising
   (A) providing a gaseous feed stream comprising carbon dioxide, wherein the pressure of said feed stream is up to 30 psia;
   (B) preferentially absorbing carbon dioxide from said feed stream into a liquid absorbent fluid comprising an organic amine absorbent to form a carbon dioxide enriched liquid absorbent stream;
   (C) pressurizing said carbon dioxide enriched liquid absorbent stream to a pressure sufficient to enable the stream to reach the top of the stripper in step (D) at a pressure of 35 psia or greater, and heating the carbon dioxide enriched liquid absorbent stream to obtain a heated carbon dioxide enriched liquid absorbent stream, wherein said pressurizing and heating are carried out in any sequence or simultaneously; and
   (D) stripping carbon dioxide from said carbon dioxide enriched liquid absorbent stream in a stripper operating at a pressure of 35 psia or greater and recovering from said stripper a gaseous carbon dioxide product stream having a pressure of 35 psia or greater.

2. A process according to claim 1 further comprising recovering stripped liquid absorbent fluid from the stripper in step (D) and recycling said fluid to step (B).

3. A process according to claim 1 wherein the gaseous feed stream has a carbon dioxide content of less than 30 vol. %.

4. A process according to claim 1 wherein said liquid absorbent fluid comprises monoethanolamine.

5. A process according to claim 4 wherein the carbon dioxide enriched liquid absorbent stream in step (C) is pressurized sufficiently so as to reach the top of
   the stripper at a pressure of 40 to 55 psia and the stripper in step (D) operates at a pressure between 40 and 55 psia.

6. A process according to claim 2 wherein the heating of step (C) is conducted by heat exchange from said stripped liquid absorbent fluid to the carbon dioxide-enriched liquid absorbent stream before said carbon dioxide-enriched liquid absorbent stream is fed to step (D).

* * * * *